United States Patent
Alberkrack et al.

(10) Patent No.: US 7,262,570 B2
(45) Date of Patent: Aug. 28, 2007

(54) MOTOR CONTROLLER WITH ENHANCED NOISE IMMUNITY UNBUFFERED HALL SENSORS

(75) Inventors: Jade H. Alberkrack, Tempe, AZ (US); Robert Alan Brannen, Chandler, AZ (US)

(73) Assignee: Andigilog, Inc., Tempe, AZ (US)

( * ) Notice: Subject to any disclaimer, the term of this patent is extended or adjusted under 35 U.S.C. 154(b) by 0 days.

(21) Appl. No.: 11/080,343

(22) Filed: Mar. 15, 2005

(65) Prior Publication Data

US 2006/0208675 A1    Sep. 21, 2006

(51) Int. Cl.
    *H02K 21/00*      (2006.01)
(52) U.S. Cl. .................. 318/254; 318/138; 318/439; 318/244; 318/246
(58) Field of Classification Search ............... 318/138, 318/254, 439, 244, 246, 700, 737
See application file for complete search history.

(56) References Cited

U.S. PATENT DOCUMENTS

| | | | | |
|---|---|---|---|---|
| 4,507,591 A | * | 3/1985 | Kelleher | 318/254 |
| 4,682,165 A | * | 7/1987 | Davis | 340/825.5 |
| 5,506,487 A | * | 4/1996 | Young et al. | 318/811 |
| 5,767,639 A | * | 6/1998 | Sakaguchi et al. | 318/254 |
| 5,847,524 A | * | 12/1998 | Erdman et al. | 318/439 |
| 6,140,781 A | * | 10/2000 | Cheong | 318/254 |
| 6,239,564 B1 | * | 5/2001 | Boe et al. | 318/254 |
| 6,901,212 B2 | * | 5/2005 | Masino | 318/254 |

\* cited by examiner

*Primary Examiner*—Lincoln Donovan
*Assistant Examiner*—Tyrone Smith
(74) *Attorney, Agent, or Firm*—Donald J. Lenkszus

(57) ABSTRACT

A method and apparatus of interfacing a Hall sensor to a commutation circuit comprises receiving output signals from the Hall sensor; detecting when the Hall sensor output signals are within a predetermined range; generating commutation output signals when the Hall sensor output signals are in a predetermined state for a predetermined period of time; and locking out a change in the commutation output signals for a second predetermined period of time.

8 Claims, 6 Drawing Sheets

| Pin | Function | Description |
|---|---|---|
| 1 | Phase 1 Output | This output directly drives phase 1 of a unipolar motor. It is active low when the voltage applied to the Hall - input exceeds that of Hall +. |
| 2 | Current Limit Set | This input is left unconnected for a maximum motor drive current of 700 mA. The drive current can be programmed to a lower level by connecting a resistor from this input to ground. |
| 3 | Signal Gnd | This pin is the control circuit substrate. It connects to the power source ground terminal. |
| 4 | $V_{DD}$ | This pin is the control circuit positive supply. It connects to the power source positive terminal. |
| 5 | Reference Output | This is the reference output and is capable of sourcing in excess of 5.0 mA. It is also used to selectively enable or disable the automatic power down feature. Automatic power down is enabled if the reference load current is 1.0 mA or less, and disabled if it is 2.0 mA or more. |
| 6 | Minimum Speed Set | A voltage level that ranges from 1.0 V to 3.0 V is applied to this input for setting a minimum motor speed. This input controls the motor speed if its voltage is greater than that of Pin 10 with Pin 11 grounded, and less than Pin 10 with Pin 11 open. The automatic power down feature must be disabled for continuous minimum speed operation. This input must be connected to Pin 4 when a variable duty cycle digital pulse train is used to control motor speed. |
| 7 | Non-Inverting Input | This is the non-inverting input of the op amp. It has an operating voltage range that extends from ground to $V_{DD}-1.2V$. |
| 8 | Inverting Input | This is the inverting input of the op amp. It has an operating voltage range that extends from ground to $V_{DD}-1.2V$. |
| 9 | Op Amp Output | This is the op amp output and it is capable of sinking or sourcing in excess of 5.0 mA. It can be used in conjunction with the reference for scaling the speed control signal derived from a temperature sensor. |
| 10 | Speed Control Input | A voltage level that ranges from 1.0 V to 3.0 V or a variable duty cycle pulse is applied to this input for controlling the motor speed. A positive or negative speed control slope can be selected via Pin 11. With a reference load current of 1.0 mA or less, the device will automatically enter power down mode when the voltage at this input is below that of Pin 6 or less than 1.0 V with Pin 11 grounded, or above that of Pin 6 or greater than 3.0 V with Pin 11 open. |
| 11 | Slope Select | This input selects between a positive or a negative speed control slope. When connected to ground, an increasing voltage at Pin 6 or 10 increases motor speed. When not connected, an increasing voltage at Pin 6 or 10 decreases motor speed. This input has an internal 10 µA current source pull-up. |
| 12 | Hall - | This input connects to the output of an unbuffered differential type Hall sensor. |
| 13 | Hall + | This input connects to the output of an unbuffered differential type Hall sensor |
| 14 | Power Ground | This pin is the ground return for the motor drive MOSFETs. It connects to the power source ground terminal. |
| 15 | Freq. Generator / Rotor Lock | This output provides a digital square wave signal that switches at the Hall sensor frequency. If the motor turns too slow or is stalled, the output will assume a high state. This is an active low open drain output and it requires a pull-up resistor. |
| 16 | Phase 2 Output | This output directly drives phase 2 of a unipolar motor. It is active low when the voltage applied to the Hall + input exceeds that of Hall -. |

FIG. 3

| Speed Control Input Pin 10 | | Minimum Speed Set Pin 6 (V) | Controlling Input | Slope Select Pin 11 | Motor Speed (%) | Comments |
|---|---|---|---|---|---|---|
| Signal | (V) | | | | | |
| Voltage | 0 to 1.0 | 0 (Disabled) | Speed Control | | 0 | Zero speed, power down mode if $I_{o(ref)} \leq 1.0$ mA, t > 1.0s. |
| | >1.0 to <3.0 | | Speed Control | | 0 to 100 | $\%t_{on} = (V_{SC} - 1.0) / 0.02$ |
| | 3.0 to 5.0 | | Speed Control | | 100 | Maximum speed. |
| | 0 to <1.7 | 1.7 | Minimum Speed Set | | 35 | Speed control voltage is less than minimum speed set. |
| | >1.7 to 3.0 | | Speed Control | | 35 to 100 | Speed control voltage is greater than minimum speed set. |
| | >3.0 to 5.0 | | Speed Control | | Maximum speed. | |
| Positive Pulse | Pulse <0.5 to >3.5 | $V_{DD}$ (Pulse Mode) | Speed Control | | Duty Cycle | Positive pulse width duty cycle control. |
| Voltage | 5.0 to 3.0 | $V_{ref}$ (Disabled) | Speed Control | 100 | 0 | Zero speed, power down mode if $I_{o(ref)} \leq 1.0$ mA, t > 1.0s. |
| | <3.0 to >1.0 | | Speed Control | | 0 to 100 | $\%t_{on} = 100 - (V_{SC} - 1.0 / 0.02)$ |
| | 1.0 to 0 | | Speed Control | | 100 | Maximum speed. |
| | 3.0 to >2.3 | 2.3 | Minimum Speed Set | | 35 | Speed control voltage is greater than minimum speed set. |
| | <2.3 to 1.0 | | Speed Control | | 35 to 100 | Speed control voltage is less than minimum speed set. |
| | <1.0 to 0 | | Speed Control | | Maximum speed. | |
| Negative Pulse | Pulse >3.5 to <0.5 | $V_{DD}$ (Pulse Mode) | Speed Control | | Duty Cycle | Negative pulse width duty cycle control. |

FIG. 6

MOTOR CONTROLLER WITH ENHANCED NOISE IMMUNITY UNBUFFERED HALL SENSORS

FIELD OF THE INVENTION

The invention pertains to a motor control circuits, in general, and to Hall effect sensor circuit utilized with a brushless direct current motor, in particular.

BACKGROUND OF THE INVENTION

It is common to utilize Hall sensors to determine motor rotor position. Unbuffered Hall sensors generate low amplitude signals that are directly proportional to the motor magnetic field. These signals are sinusoidal and typically in a range of 100 millivolts peak-to-peak. The Hall sensors are typically disposed within the motor housing, increasing the likelihood that the output signal will have electrical noise superimposed thereon.

The effect of noise on the smaller signals produced by Hall sensors can result in drive circuitry producing unwanted multiple drive pulses as the sensor output voltage approaches and crosses zero. One result of multiple pulses as the sensor voltage goes through zero is rattling of the motor stator and output switch overstress as the outputs repetitively switch back and forth between phases during commutation.

SUMMARY OF THE INVENTION

In accordance with the principles of the invention, a circuit for use with an unbuffered Hall sensor is provided. The circuit comprises a first circuit coupleable to the Hall sensor to provide first output signals when the magnitude of signals from the Hall sensor within a first predetermined voltage magnitude range. A first time dependent circuit is coupled to the zero crossing detector circuit. The first time dependent circuit generates second output signals if the first output signals have a predetermined relationship for a first predetermined time period. A lockout timer circuit is coupled to the first time dependent circuit.

In the illustrative embodiment of the invention, a motor driver circuit is controlled by the second output signals.

In accordance with one aspect of the invention an integrated circuit has the first circuit, the time dependent circuit, the lockout timer and the motor driver circuit formed thereron.

A commutation circuit in accordance with the principles of the invention comprises a pair of terminals coupleable to a Hall sensor; zero crossing detection circuitry coupled to the pair of terminals; a timer coupled to the zero crossing detection circuitry; a commutation latch coupled to the zero crossing detection circuitry via the timer; a lockout timer coupled to the commutation latch and the timer; and motor driver circuitry coupled to the commutation latch.

Further in accordance with the principles of the invention, the commutation circuit comprises an integrated circuit having the zero crossing detection circuitry, the timer, the commutation latch, the lockout timer and the motor drive circuitry formed thereon.

A method of interfacing a Hall sensor to a commutation circuit comprises receiving output signals from the Hall sensor; detecting when the Hall sensor output signals are within a predetermined range; generating commutation output signals when the Hall sensor output signals are in a predetermined state for a predetermined period of time; and locking out a change in the commutation output signals for a second predetermined period of time.

In the illustrative embodiment of the invention the predetermined range is a zero crossing voltage range.

Further in accordance with the principles of the invention, the second predetermined period of time is selected to prevent noise signals superimposed on the Hall sensor output signals from affecting the generating of the commutation output signals.

BRIEF DESCRIPTION OF THE DRAWING

The invention will be better understood from a reading of the following detailed description of the drawing in which like reference designators are used to identify like elements in the various drawing figures, and in which;

FIG. 3 is a table that defines the function of each terminal of the motor control circuit of FIG. 2;

FIG. 6 illustrates the motor speed as a function of control voltage in table form;

DETAILED DESCRIPTION

A motor controller 100 of the illustrative embodiment is a full featured two phase half wave variable speed brushless motor controller having complete functionality for a fan control system. Motor controller 100 provides a selectable slope pulse width modulator (PWM) with double pulse suppression for efficient speed control that is compatible with an analog voltage or varying duty cycle digital pulse train, a programmable minimum speed set input, an uncommitted op amp with a reference for speed control signal scaling, a Hall sensor amplifier with noise immunity circuitry for proper drive sequencing, adaptive non-overlapping commutation logic for reduced supply current spiking, on-chip 1.0 Ω power MOSFETs for direct coil drive. Protective and diagnostic features provided by motor controller 100 include an internal fault timer with auto start retry, motor kick start timer to insure proper start up, programmable cycle-by-cycle current limiting, power supply under voltage lockout, and over temperature thermal shutdown, and a combined frequency generator/rotor lock output for status reporting.

Motor controller 100 may be used in thermal open or closed loop systems. Motor controller 100 can be controlled by simple NTC or PTC thermistors, Simistor™ silicon temperature sensors, and complex digital or microcontroller temperature monitors.

Figure 1:
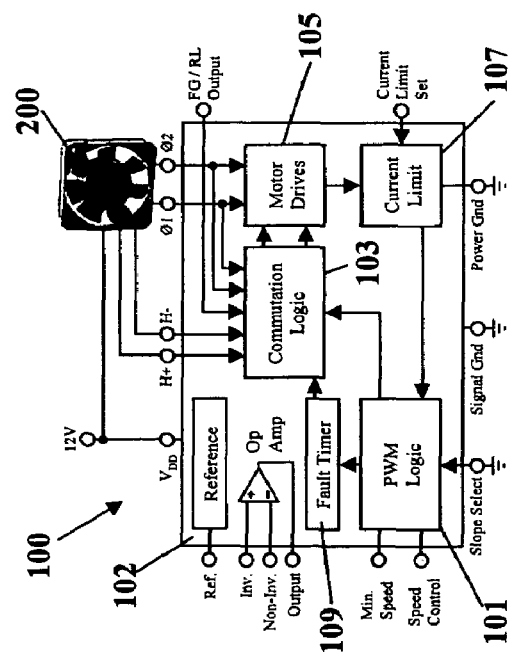
FIG. 1 is a block diagram of a motor control circuit to which the present invention is particularly well suited.

Turning now to FIG. 1, controller 100 for speed control of motor 200 includes a pulse width modulator logic or PWM circuit 101, commutation logic for proper drive sequencing 103, direct motor drive 105, current limiter 107, and a programmable fault timer 109 with time power down and kick start features. Controller 100, fully integrated on a single chip 102 contains all required functions for implementing fan speed control.

Figure 2:
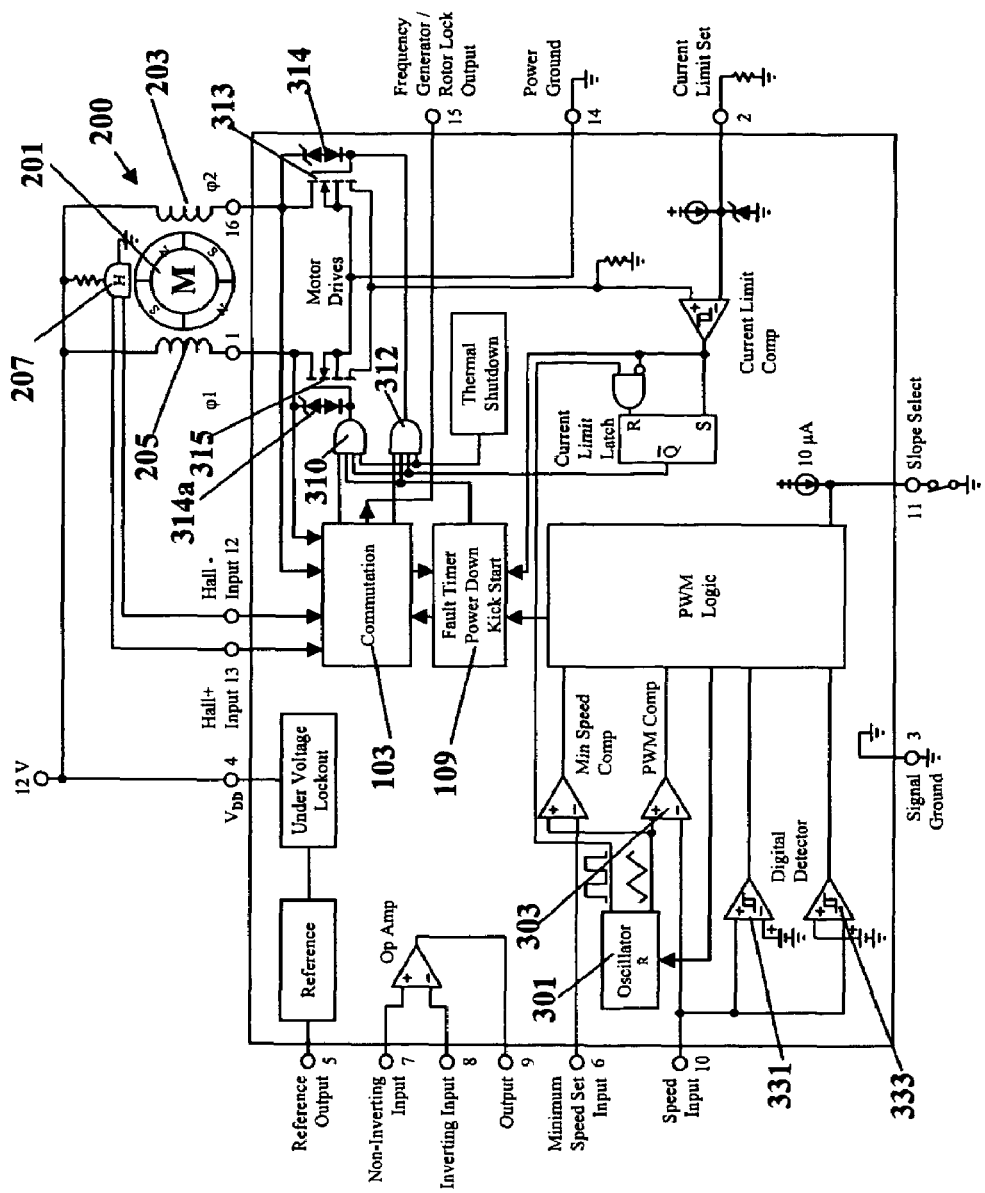
FIG. 2 is a more detailed diagram of the motor control circuit of FIG. 1 connected to a cooling fan.

A more detailed block diagram of motor controller 100 shown in FIG. 2. A brief description of the pin functions is provided in FIG. 3.

Motor 200 includes rotor 201 and stator windings 203, 205. A rotator position sensor 207 is provided with motor 200. In a typical motor fan arrangement, a Hall effect device sensor is utilized as sensor 207. Motor 200 includes connections Ø1, Ø2, a sensor outputs H+ and H− and power connections.

Motor controller 100 efficiently controls motor speed of a motor 200 by the use of pulse width modulation. Motor 200 includes two windings 203, 205. The voltage applied to the speed control input, pin 10, provides control of the motor speed by varying the drive percent on-time or conduction time of the phase 1 and phase 2 outputs φ1, φ2 during the commutation cycle. The control signal at speed control input pin 10 can be in the form of an analog voltage ranging from 1.0 V to 3.0 V, or a variable duty cycle digital pulse train having a low state maximum of 0.98 V and a high state minimum of 3.02 V. The control signal transfer slope, speed control voltage to percent on-time, can be programmed via a slope select input at pin 11. When pin 11 is connected to ground, an increase in control voltage or a digital high state results in an increase in motor drive on-time. When pin 11 is unconnected, an increase in control voltage or a digital high state results in a decrease in drive on-time.

A second control input is made available at pin 6 for setting a minimum motor speed. It has a control transfer that is similar to that of pin 10 and is designed be programmed from an analog voltage that ranges from 1.0 V to 3.0 V, which can be derived from the reference. The minimum speed programmed at this input will take control if it is greater than the speed indicated at pin 10.

Figure 4:
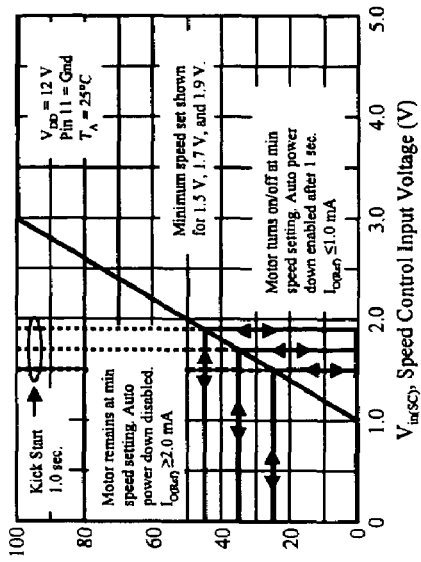
FIGS. 4 and 5 are graphs showing motor speed as a function of the input voltage to the motor control circuit of FIG. 1.

FIG. 4 shows the motor drives percent on-time versus the speed control input voltage with pin 11 connected to ground for positive slope control. Notice that there are two defined outcomes when the speed control input voltage falls below that of the minimum speed set. The first is that the motor remains at the programmed minimum speed setting and this is selected by loading the reference with 2.0 mA or more to disable auto power down. The second outcome is that the motor turns off after 1.0 second and this is selected by loading the reference with 1.0 mA or less to enable auto power down.

Figure 5:
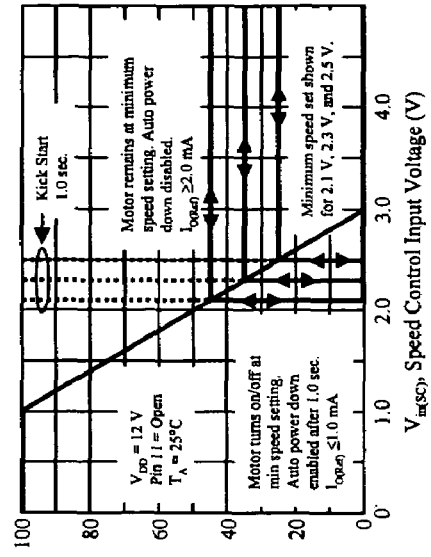

FIG. 5 shows the motor drives percent on-time versus the speed control input voltage with pin 11 unconnected for negative slope control. The minimum speed operating characteristics are selected in the same manner as above but with the defined outcomes now occurring when the speed control input voltage rises above that of the minimum speed set.

The programmed minimum motor speed can be disabled by connecting pin 6 to ground if pin 11 is also at ground, or by connecting pin 6 to the reference if pin 11 is unconnected. When controlling the motor speed from a variable duty cycle digital pulse train, the minimum speed set feature is not available and pin 6 must be connected to $V_{DD}$, pin 4. FIG. 6 shows the speed control operation in table form.

For applications that do not require speed control, the device can easily be programmed for maximum motor speed without requiring any additional components. This is accomplished by connecting pins 6 and 10 to the reference output when pin 11 is at ground, or by connecting pins 6 and 10 to ground when pin 11 is open.

Rotor position of motor 200 is detected by a single Hall sensor 207 to enable proper motor drive commutation. The H+ and H− inputs to controller 100 are designed to interface with a wide variety of economical 4 pin unbuffered 'naked' or 3 pin buffered 'digital' type Hall sensors. The unbuffered types provide a low level output signal that is directly proportional to the applied magnetic field. These sensors connect directly to inputs H+ and H−. The inputs have a differential sensitivity of 20 mV with a common mode voltage range that extends from ground to $V_{DD}$-1.5 V. By extending the input range to include ground, the need of a series ground lead resistor for offsetting the Hall output is eliminated.

Controller 100 provides enhanced noise rejection by combining a small level of input hysteresis with a zero crossing detector and a timed lockout.

Buffered Hall sensors provide a high level output signal that changes state in direct response the rotor magnetic pole transitions. This output signal is single ended and can be applied to either the H+ or H− input while biasing the unused input to a level that is half the sensors output voltage swing. Economical buffered Hall sensors typically have an open collector NPN output which requires a pull up resistor to the motor supply voltage $V_M$.

Figure 7:
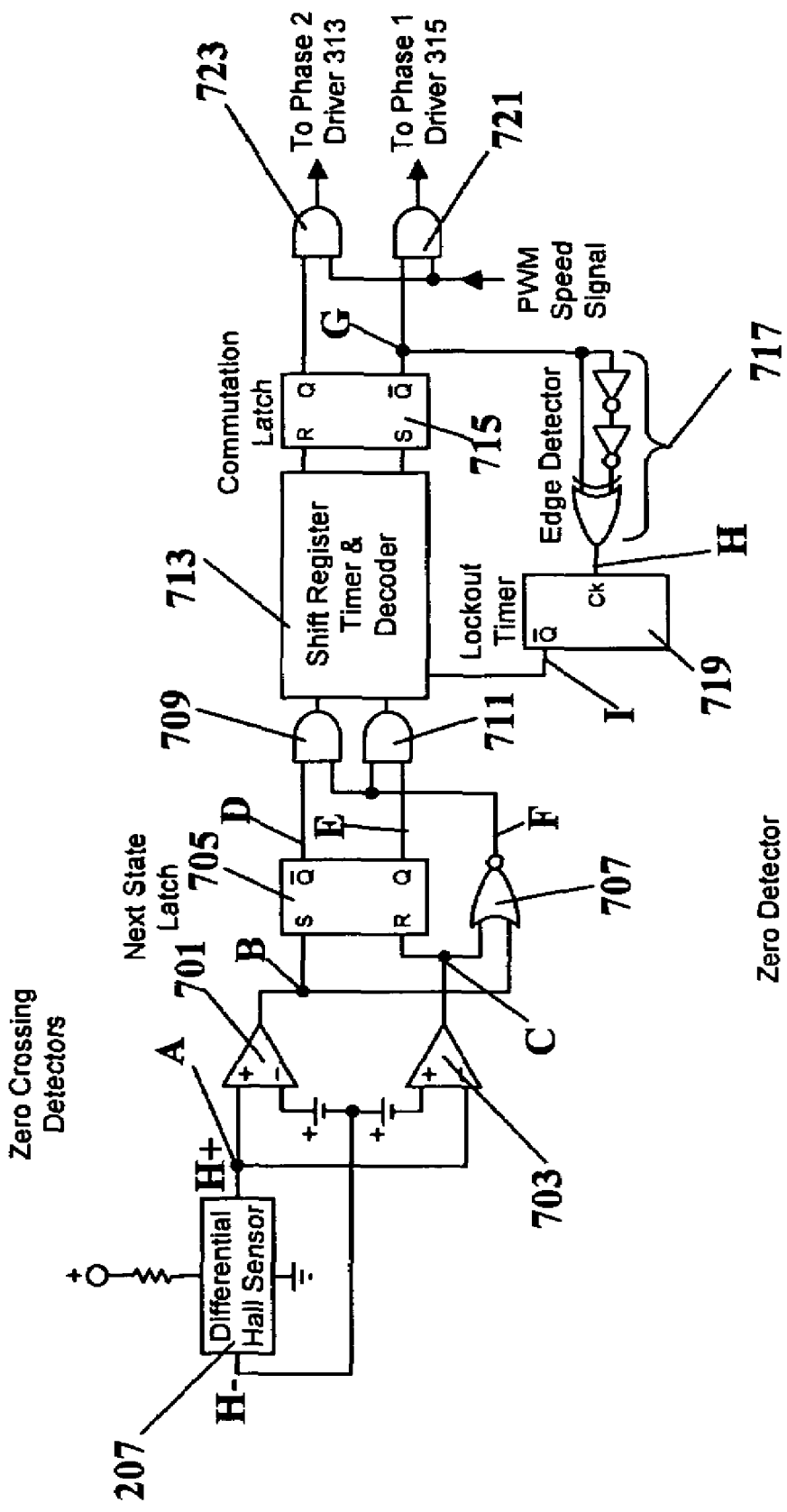
FIG. 7 illustrates a circuit in accordance with the principles of the invention.
Figure 8:
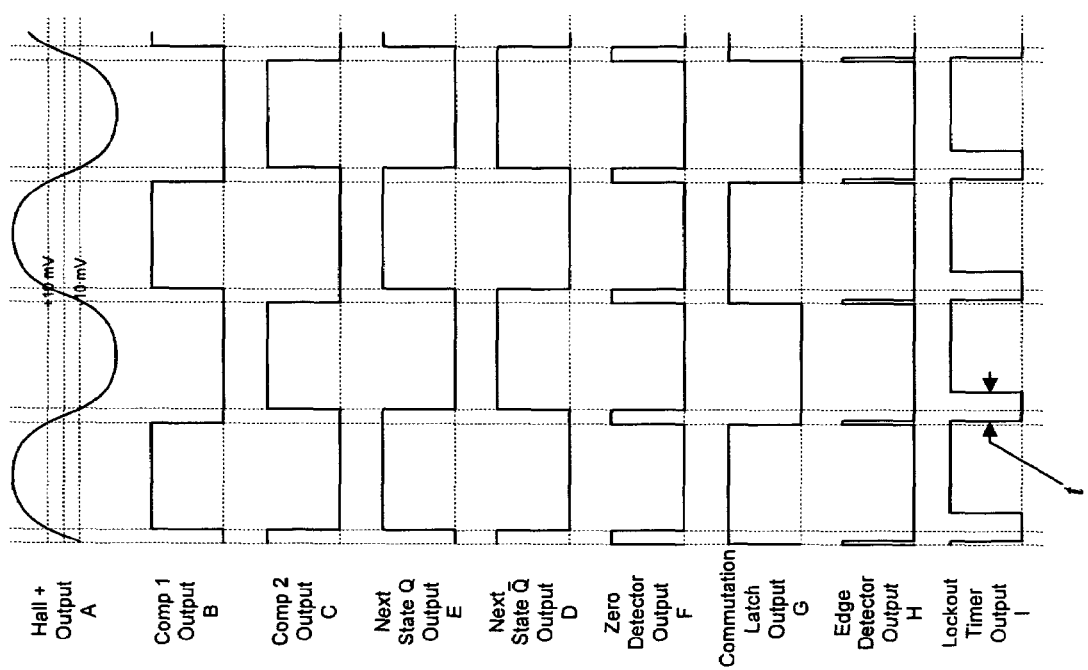
FIG. 8 shows waveforms at points in the circuit of FIG. 7.

Turning now to FIG. 7 a circuit providing enhanced noise immunity for unbuffered Hall sensors is shown. Hall sensor 207 outputs H+ and H− are coupled to a first circuit coupleable to said Hall sensor providing first output signals when the magnitude of signals from said Hall sensor is within a first predetermined voltage magnitude range. In this embodiment, the first circuit comprises a pair of zero crossing detectors 701, 703. In other embodiments the predetermined voltage magnitude range may be at some voltage range offset from zero. Hall sensor outputs H+ and H− are coupled to the inputs of a pair of zero crossing detectors 701, 703. Each zero crossing detector 701, 703 provides a low level output when the input is less than, or more than a predetermined voltage, respectively. In the illustrative embodiment, that predetermined voltage is 10 millivolts. FIG. 8 illustrates Hall sensor output at node A and the outputs of zero crossing detector 701 at node B and zero crossing detector 703 at node C. A next state latch 705 has its set S and reset R inputs coupled to zero crossing detectors 701, 703 respectfully. The Q' and Q outputs of latch 705 are coupled to AND gates 709, 711, respectively. The waveforms at points D and E, corresponding to latch outputs Q' and Q are shown in HG. 8. The outputs of zero crossing detectors 701, 703 are also coupled to the inputs of a zero detector 707. Zero detector 707 comprises a NOR gate. The output waveform at the output F of zero detector 707 is shown in FIG. 8. The output of zero detector 707 is also coupled to inputs of AND gates 709, 711. The outputs of gates 709, 711 are coupled to inputs of a shift register timer and decoder circuit 713. The outputs of shift register timer and decoder circuit 713 are coupled to a commutation latch 715. One output Q' of commutation latch 715 is coupled to an edge detector 717 which is used to trigger a lockout timer 719. Lockout timer 719 provides a control input to shift register timer and decoder circuit 713. The waveform G at the output Q' of commutation latch and the output waveforms H and I of edge detector 717 and lockout timer 719, respectively, are shown in FIG. 8.

During zero crossing detector 707 outputs high state as shown in waveform F, the data from the next state latch 705 must be constant for a first predetermined time before the commutation latch 715 is updated. Once updated, the commutation latch 715 data cannot change during the lockout time period t established by lockout timer 719. Noise present at the Hall sensor outputs H+, H− cannot change the commutation latch 715 state during the lockout timer 719 lockout time period t.

The outputs Q and Q' of commutation latch 715 are combined with the PWM speed signal generated within controller 100 by gates 721 and 723 to provide motor commutation and PWM speed signals to drivers 315, 313, respectively.

Controller 100 utilizes pulse width modulation to provide an energy efficient means for controlling the motor speed of fan motor 200 by varying the average applied voltage to each stator winding 203, 205 during the commutation sequence.

Direct motor drive is accomplished by providing two on-chip open drain N-channel MOSFETs 313, 315, each having a high breakdown voltage. The respective MOSFET 313, 315 drains are pinned out to output terminals φ1, φ2 for direct connection to motor windings 203, 205. Zener and series diodes 314, 314a are connected from each respective MOSFET drain to gate to protect the MOSFETs 313, 315 from excessive inductive voltage spikes.

The invention has been described in conjunction with a specific illustrative embodiment. It will be understood by those skilled in the art that various changes, substitutions and modifications may be made without departing from the spirit or scope of the invention. It is intended that all such changes, substitutions and modifications be included in the scope of the invention. It is not intended that the invention be limited to the illustrative embodiment shown and described herein. It is intended that the invention be limited only by the claims appended hereto, giving the claims the broadest possible scope and coverage permitted under the law.

What is claimed is:

1. A circuit for use with an unbuffered Hall sensor, comprising:
    a first circuit coupleable to said unbuffered Hall sensor said first circuit providing first output signals when the magnitude of signals from said Hall sensor is within a first predetermined voltage magnitude range:
    a first time dependent circuit coupled to said first circuit, said first time dependent circuit generating second output signals if said fast output signals have a predetermined relationship for a first predetermined time period; and
    a lockout timer circuit coupled to said first time dependent circuit, said lockout timer circuit preventing changes in said first output signals occurring within a lockout time period from effecting generation of said second output signals.

2. A circuit in accordance with claim 1, comprising:
    a motor driver circuit controlled by said second output signals.

3. A circuit in accordance with claim 2, comprising:
    an integrated circuit having said first circuit, said first time dependent circuit, said lockout timer circuit and said motor driver circuit formed thereon.

4. A circuit in accordance with claim 3, comprising:
    a pair of first terminals coupled to said first circuit and coupleable to a Hall sensor; and
    a pair of second terminals coupled to said motor driver circuit and coupleable to a motor.

5. A commutation circuit comprising:
    a pair of terminals coupleable to a Hall sensor;
    zero crossing detection circuitry coupled to said pair of terminals;
    a timer coupled to said zero crossing detection circuitry;
    a commutation latch coupled to said zero crossing detection circuitry via said timer to generate commutation output signals when said Hall sensor output signals are in a predetermined state for a predetermined period of time;
    a lockout timer coupled to said commutation latch and said timer to lock out a change in said commutation output signals for a second predetermined period of time to prevent noise signals superimposed on said Hall sensor output signals from affecting said generating of said commutation output signals; and
    motor driver circuitry coupled to said commutation latch to receive said commutation output signals.

6. A commutation circuit in accordance with claim 5, comprising:
    an integrated circuit having said zero crossing detection circuitry, said timer, said commutation latch, said lockout timer and said motor drive circuitry formed thereon.

7. A commutation circuit in accordance with claim 5, wherein:
    said timer comprises a shift register.

8. A method of interfacing a Hall sensor to a commutation circuit comprising:
    receiving output signals from said Hall sensor;
    detecting when said Hall sensor output signals are within a predetermined range;
    determining said predetermined range to be a zero crossing voltage range;
    generating commutation output signals when said Hall sensor output signals are in a predetermined state for a predetermined period of time;
    locking out a change in said commutation output signals for a second predetermined period of time; and
    selecting said second predetermined period of time to prevent noise signals superimposed on said Hall sensor output signals from affecting said generating of said commutation output signals.

\* \* \* \* \*

UNITED STATES PATENT AND TRADEMARK OFFICE
CERTIFICATE OF CORRECTION

PATENT NO. : 7,262,570 B2 Page 1 of 1
APPLICATION NO. : 11/080343
DATED : August 28, 2007
INVENTOR(S) : Jade H. Alberkrack et al.

It is certified that error appears in the above-identified patent and that said Letters Patent is hereby corrected as shown below:

<u>COLUMN 5</u>

Claim 1, line 40 please delete "fast" and insert --first--.

Signed and Sealed this

Eighth Day of September, 2009

David J. Kappos
*Director of the United States Patent and Trademark Office*